(12) United States Patent
Björkman et al.

(10) Patent No.: US 12,296,815 B2
(45) Date of Patent: May 13, 2025

(54) METHOD FOR DRIVING AT LEAST ONE POWER CONSUMER CONNECTED TO A POWERTRAIN

(71) Applicant: Scania CV AB, Södertälje (SE)

(72) Inventors: Mathias Björkman, Tullinge (SE); Niklas Pettersson, Stockholm (SE); Fredrik Sundén, Älvsjö (SE); Mikael Bergquist, Huddinge (SE); Johan Lindström, Nyköping (SE)

(73) Assignee: Scania CV AB, Södertälje (SE)

( * ) Notice: Subject to any disclaimer, the term of this patent is extended or adjusted under 35 U.S.C. 154(b) by 241 days.

(21) Appl. No.: 17/774,939

(22) PCT Filed: Oct. 27, 2020

(86) PCT No.: PCT/SE2020/051037
§ 371 (c)(1),
(2) Date: May 6, 2022

(87) PCT Pub. No.: WO2021/096407
PCT Pub. Date: May 20, 2021

(65) Prior Publication Data
US 2022/0388495 A1 Dec. 8, 2022

(30) Foreign Application Priority Data
Nov. 13, 2019 (SE) .................... 1951307-6

(51) Int. Cl.
*B60W 20/40* (2016.01)
*B60K 6/26* (2007.10)
(Continued)

(52) U.S. Cl.
CPC ............... *B60W 20/40* (2013.01); *B60K 6/26* (2013.01); *B60K 6/365* (2013.01); *B60K 6/387* (2013.01);
(Continued)

(58) Field of Classification Search
CPC ...... B60W 20/40; B60W 20/15; B60W 10/02; B60W 10/08; B60W 10/113; B60W 10/06;
(Continued)

(56) References Cited

U.S. PATENT DOCUMENTS 5,730,676 A 3/1998 Schmidt
6,805,648 B1 10/2004 Ehrlinger
(Continued)

FOREIGN PATENT DOCUMENTS

EP 2154016 A1 2/2010
WO 2009024162 A1 2/2009
(Continued)

OTHER PUBLICATIONS

WO 2009024162 Translate (Year: 2007).*
(Continued)

*Primary Examiner* — Yufeng Zhang
(74) *Attorney, Agent, or Firm* — Banner & Witcoff, Ltd.

(57) ABSTRACT

The invention relates to a method, performed by a control device, for driving at least one power consumer connected to a powertrain of a vehicle. The at least one propulsion unit comprises a first electrical machine and a second electrical machine, wherein the first electrical machine is connected to a first main shaft and the second electrical machine is connected to a second main shaft. A connection shaft is connected to the first electrical machine; and the at least one power consumer comprises a first power consumer connected to the first main shaft and/or a second power consumer connected to the connection shaft. The method comprising: controlling the powertrain to provide uninterrupted propelling torque on the first main shaft and/or on the connection shaft during a stand still condition of the output shaft of the gearbox and/or during a transition from a stand
(Continued)

still condition to a rotational condition of the output shaft of the gearbox, and/or during gear shifting from one gear to another gear in the gearbox. The invention also relates to a vehicle comprising a powertrain, a computer program and a computer-readable medium.

15 Claims, 5 Drawing Sheets

(51) Int. Cl.
*B60K 6/365* (2007.10)
*B60K 6/387* (2007.10)
*B60K 6/48* (2007.10)
*B60K 6/547* (2007.10)
*B60W 10/02* (2006.01)
*B60W 10/08* (2006.01)
*B60W 10/113* (2012.01)
*B60W 20/15* (2016.01)
*F02N 11/08* (2006.01)
*F16H 37/06* (2006.01)
*F16H 61/02* (2006.01)
*G09G 3/3233* (2016.01)

(52) U.S. Cl.
CPC .............. *B60K 6/48* (2013.01); *B60K 6/547* (2013.01); *B60W 10/02* (2013.01); *B60W 10/08* (2013.01); *B60W 10/113* (2013.01); *B60W 20/15* (2016.01); *F02N 11/0859* (2013.01); *F16H 37/065* (2013.01); *F16H 61/0204* (2013.01); *G09G 3/3233* (2013.01); *B60K 2006/268* (2013.01); *B60K 2006/4825* (2013.01); *B60Y 2200/92* (2013.01)

(58) Field of Classification Search
CPC ....... B60W 10/30; G09G 3/3233; B60K 6/26; B60K 6/365; B60K 6/387; B60K 6/48; B60K 6/547; B60K 2006/268; B60K 2006/4825; B60K 1/00; B60K 1/02; B60K 17/28; F02N 11/0859; F16H 37/065; F16H 61/0204; B60Y 2200/92
See application file for complete search history.

(56) References Cited

U.S. PATENT DOCUMENTS

| | | |
|---|---|---|
| 2004/0154845 A1 | 8/2004 | Schmidt |
| 2006/0025260 A1 | 2/2006 | Klemen et al. |
| 2014/0283646 A1* | 9/2014 | Moore ............... B60K 6/48 903/902 |
| 2015/0135863 A1 | 5/2015 | Dalum |
| 2016/0090091 A1 | 3/2016 | Gugel et al. |
| 2017/0015309 A1 | 1/2017 | Lindstrom et al. |
| 2018/0354500 A1 | 12/2018 | Iwashita et al. |
| 2019/0126737 A1 | 5/2019 | Lo et al. |
| 2019/0135261 A1 | 5/2019 | Gersten et al. |

FOREIGN PATENT DOCUMENTS

| | | |
|---|---|---|
| WO | 2012034031 A2 | 3/2012 |
| WO | 2017095296 A1 | 6/2017 |

OTHER PUBLICATIONS

Nov. 7, 2022—(RU) Office Action—App. No. 2022114982.
Feb. 16, 2021—(WO) International Search Report & Written Opinion—App. No. PCT/SE2020/051037.
Apr. 27, 2020—(SE) Office Action—App. No. 1951270-6.
May 8, 2019—(SE) Technology Search Report.
May 15, 2023—(EP) Article 94(3) Communication—App. No. 20800365.7.
Nov. 11, 2024—(EP) Article 94(3) Communication—App. No. 20800365.7.

* cited by examiner

__METHOD FOR DRIVING AT LEAST ONE POWER CONSUMER CONNECTED TO A POWERTRAIN__

CROSS-REFERENCE TO RELATED APPLICATIONS

The present application claims priority from and is a U.S. National Phase of International Application No. PCT/SE2020/051037, which was filed on Oct. 27, 2020, designating the United States of America and claiming priority to Swedish Patent Application No. 1951307-6, filed on Nov. 13, 2019. This application claims priority to and the benefit of the above-identified applications, which are all fully incorporated by reference herein in their entireties.

TECHNICAL FIELD

The present invention relates to a method for driving at least one power consumer connected to a powertrain of a vehicle. The invention also relates to a vehicle comprising a powertrain, a computer program and a computer-readable medium.

BACKGROUND

A vehicle powertrain may not only be used to propel a vehicle but it may also be configured to provide energy to power consumers such as power take-offs (PTO) and other auxiliary functions. A power take-off may be used to transmit power/energy to attached implements of the vehicle or to separate machines. A power take-off may thus be used to drive a pump, operating a boom, operating a mixer or similar. Power take-offs are typically connected to a lay shaft of a gearbox, whereby the lay shaft drives the power take-off. With this arrangement, energy will only be provided to the power take-off when the vehicle is moving and the lay shaft is rotating.

Power take-offs may also be connected to a combustion engine in the vehicle powertrain whereby the combustion engine drives the power take-off. With this arrangement, energy will be provided to the power take-off when the vehicle is moving and when the vehicle is standing still. However, when the combustion engine is switched off, energy will not be provided to the power take-off.

Power take-offs may also be connected to a combustion engine and/or electrical machines in a hybrid vehicle powertrain, whereby the combustion engine and/or the electrical machines drives the power take-off under certain driving conditions of the vehicle.

Document U.S. Pat. No. 5,730,676 A discloses an electromechanical transmission with a combustion engine and a pair of motor/generators, which are able to drive a power take-off. According to an embodiment, the power take-off is connected to a ring wheel of a planetary gear. The combustion engine and the motor/generators are also connected to the planetary gear.

SUMMARY

Some power consumers such as power take-offs and other auxiliary functions connected to the powertrain of the vehicle need uninterrupted energy and driving torque both when the vehicle stands still and moving. In addition, in a hybrid vehicle powertrain provided with a combustion engine and electrical machines, the combustion engine is switched off during certain driving conditions of the vehicle. Therefore, the power consumers connected to a hybrid vehicle powertrain need energy and driving torque even though the combustion engine is switched off.

Therefore, it would be desirable to achieve a method for driving at least one power consumer connected to a powertrain of a vehicle during standstill, take off and driving of the vehicle. Further, it would be desirable to achieve a method for driving at least one power consumer connected to a powertrain of a vehicle during gear shifting in a gearbox of the powertrain. In addition, it would be desirable to achieve a method for driving at least one power consumer connected to a powertrain of a vehicle during switched off conditions of a combustion engine of the powertrain.

An object of the present invention is therefore to achieve a new and advantageous method for driving at least one power consumer connected to a powertrain of a vehicle during standstill, take off and driving of the vehicle. Another object is to achieve a new and advantageous method for driving at least one power consumer connected to a powertrain of a vehicle during gear shifting in a gearbox of the powertrain. Another object is to achieve a new and advantageous method for driving at least one power consumer connected to a powertrain of a vehicle during switched off conditions of a combustion engine of the powertrain. Another object of the invention is to achieve a new and advantageous vehicle, computer program and computer-readable medium.

The herein mentioned objects are achieved by a method, a vehicle, a computer program, and a computer-readable medium according to the independent claims.

Hence, according to an aspect of the present invention a method, performed by a control device, for driving at least one power consumer connected to a powertrain of a vehicle is provided. The powertrain comprises at least one propulsion unit and a gearbox. The gearbox comprises a first main shaft; a second main shaft; an output shaft of the gearbox connected to drive wheels of the vehicle; a lay shaft connected to the first main shaft, the second main shaft and the output shaft of the gearbox; a first gear pair connected to the first main shaft and the lay shaft; a second gear pair connected to the second main shaft and the lay shaft; wherein the at least one propulsion unit comprises a first electrical machine and a second electrical machine, wherein the first electrical machine is connected to the first main shaft and the second electrical machine is connected to the second main shaft; wherein a connection shaft is connected to the first electrical machine; and wherein the at least one power consumer comprises a first power consumer connected to the first main shaft and/or a second power consumer connected to the connection shaft. The method comprises: controlling the powertrain to provide uninterrupted propelling torque on the first main shaft and/or on the connection shaft during a stand still condition of the output shaft of the gearbox and/or during a transition from a stand still condition to a rotational condition of the output shaft of the gearbox, and/or during gear shifting from one gear to another gear in the gearbox.

According to another aspect of the invention, a vehicle comprising a powertrain is provided. The powertrain comprising: at least one propulsion unit; a gearbox; and a control device. The gearbox comprising: a first main shaft; a second main shaft; an output shaft of the gearbox connected to drive wheels of the vehicle; a lay shaft connected to the first main shaft, the second main shaft and the output shaft of the gearbox; a first gear pair connected to the first main shaft and the lay shaft; a second gear pair connected to the second main shaft and the lay shaft; and at least one power consumer connected to a powertrain, wherein the at least one propulsion unit comprises a first electrical machine and a second electrical machine, wherein the first electrical machine is connected to the first main shaft and the second electrical machine is connected to the second main shaft; wherein a connection shaft is connected to the first electrical machine; wherein the at least one power consumer comprises a first power consumer connected to the first main shaft and/or a second power consumer connected to the connection shaft; and wherein the control device is configured to control the powertrain to provide uninterrupted propelling torque on the first main shaft and/or on the connection shaft during a stand still condition of the output shaft of the gearbox and/or during a transition from a stand still condition to a rotational condition of the output shaft of the gearbox, and/or during gear shifting from one gear to another gear in the gearbox.

By such method and vehicle the power consumers connected to the powertrain may be driven during standstill, take off and driving of the vehicle. In addition, the power consumers connected to a powertrain of a vehicle may be driven during gear shifting in the gearbox of the powertrain. In addition, the power consumers connected to the powertrain of a vehicle may be driven during switched off conditions of the combustion engine of the powertrain.

The propelling torque can be split/divided between the main shafts, and with the first power consumer connected to the first main shaft, the first power consumer may be driven by said main shaft when the vehicle is standing still and the first main shaft is disconnected from the output shaft of the gearbox. When driven by the first main shaft, the first main shaft transfers torque and rotation motion to the first power consumer. Furthermore, the first power consumer can be driven by the first main shaft while the second main shaft provides/transmits propelling torque to the output shaft of the gearbox. The first power consumer can be driven during standstill, take off and driving of the vehicle. The first power consumer can also be driven during gear shifting in the gearbox. According to an example, the powertrain comprises also a combustion engine as propulsion unit. However, the first power consumer can also be driven when the combustion engine is switched off.

The second power consumer is connected to and driven by the connection shaft, which is connected to the first electrical machine. When driven by the connection shaft, the first main shaft transfers torque and rotation motion to the second power consumer. The second power consumer may alternatively to, or in combination with the first power consumer be connected to the powertrain. The second power consumer can be driven during standstill, take off and driving of the vehicle. The second power consumer can also be driven during gear shifting in the gearbox. According to an example, the powertrain comprises also a combustion engine as propulsion unit. However, the second power consumer can also be driven when the combustion engine is switched off.

The first and/or the second power consumer extract torque from the powertrain and thereby applies a load on the powertrain. When propelling torque is provided only on the second main shaft, the resulting torque acting on the first main shaft will be the negative (extracted) torque corresponding to the load applied by the first and/or second power consumer. When the resulting torque on the first main shaft is negative, the first main shaft will be driven by the lay shaft via the first gear pair connected to the lay shaft and the first main shaft. The first and/or second power consumer connected to the first main shaft and/or the connection shaft, respective, will thereby be driven by the first main shaft and/or the connection shaft, respective. Thus, some of the propelling torque provided on the second main shaft will be transmitted to the first main shaft and/or connection shaft to drive the first and/or second power consumer, respective. The first gear pair connected to the lay shaft and the first main shaft comprises a gear wheel connected on each shaft. When propelling torque provided on the second main shaft drives the first main shaft, the gear wheel on the lay shaft will drive the gear wheel on the first main shaft. By gradually transferring propelling torque from the second main shaft to the first main shaft, propelling torque will be provided on both the first main shaft and the second main shaft and also to the connection shaft. The resulting torque acting on the first main shaft and/or the connection shaft will then be the propelling torque provided on the first main shaft and/or the connection shaft by the at least one propulsion unit minus the torque corresponding to the load applied by the first and/or second power consumer. When the propelling torque provided on the first main shaft and/or the connection shaft is large enough to drive the first and/or second power consumer, no propelling torque provided on the second main shaft will drive the first main shaft and/or the connection shaft. Thus, when the resulting torque acting on the first main shaft and/or connection shaft is positive, the first main shaft will drive the lay shaft. When the propelling torque provided on the first main shaft corresponds to the load applied by the first power consumer, the resulting torque acting on the first main shaft will be zero Nm. Torque balance is thereby achieved over the first gear pair. When the propelling torque provided on the first main shaft is further increased, propelling torque provided on the first main shaft will drive the lay shaft. When propelling torque provided on the first main shaft is transmitted through the first gear pair to the lay shaft and the output shaft of the gearbox, the gear wheel on the first main shaft will instead drive the gear wheel on the lay shaft.

Further objects, advantages and novel features of the present invention will become apparent to one skilled in the art from the following details, and also by putting the invention into practice. Whereas examples of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present disclosure, further objects and advantages of it, the detailed description set out below should be read together with the accompanying drawings, in which the same reference notations denote similar items in the various figures, and in which.

DETAILED DESCRIPTION

Figure 1:
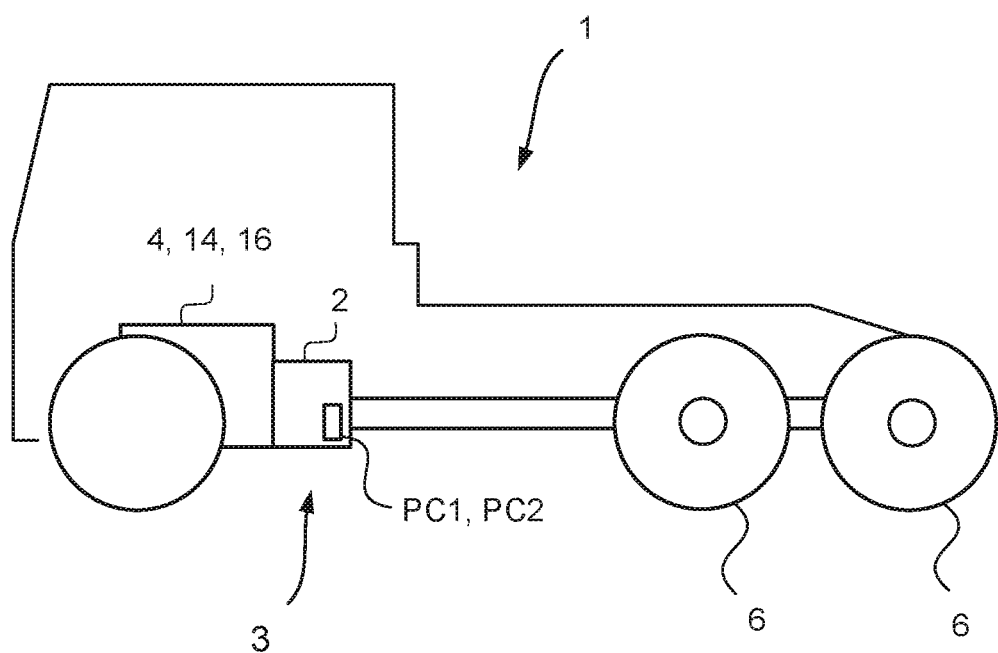
FIG. 1 schematically illustrates a side view of a vehicle according to an example.

According to an aspect of the present disclosure, a method, performed by a control device, for driving at least one power consumer connected to a powertrain of a vehicle is provided. The powertrain comprises at least one propulsion unit and a gearbox. The gearbox comprises a first main shaft; a second main shaft; an output shaft of the gearbox connected to drive wheels of the vehicle; a lay shaft connected to the first main shaft, the second main shaft and the output shaft of the gearbox; a first gear pair connected to the first main shaft and the lay shaft; a second gear pair connected to the second main shaft and the lay shaft; wherein the at least one propulsion unit comprises a first electrical machine and a second electrical machine, wherein the first electrical machine is connected to the first main shaft and the second electrical machine is connected to the second main shaft; wherein a connection shaft is connected to the first electrical machine; and wherein the at least one power consumer comprises a first power consumer connected to the first main shaft and/or a second power consumer connected to the connection shaft. The method comprises: controlling the powertrain to provide uninterrupted propelling torque on the first main shaft and/or on the connection shaft during a stand still condition of the output shaft of the gearbox and/or during a transition from a stand still condition to a rotational condition of the output shaft of the gearbox, and/or during gear shifting from one gear to another gear in the gearbox.

The first main shaft and the second main shaft may be connectable to the at least one propulsion unit, so that propelling torque can be provided on the first main shaft and the second main shaft simultaneously. Propelling torque may thus be provided in parallel. Propelling torque is herein defined as torque provided by means of the at least one propulsion unit to propel the vehicle. Thus, the first main shaft and the second main shaft may be arranged, so that propelling torque provided by means of the at least one propulsion unit can be divided/split between the first main shaft and the second main shaft.

The powertrain may be controlled to gradually transfer propelling torque from the second main shaft to the first main shaft by reducing the propelling torque provided on the second main shaft and gradually increasing the propelling torque provided on the first main shaft. In addition, the powertrain may be controlled to gradually transfer propelling torque from the first main shaft to the second main shaft by reducing the propelling torque provided on the first main shaft and gradually increasing the propelling torque provided on the second main shaft.

The output shaft of the gearbox is connected to drive wheels of the vehicle. A propeller shaft may be arranged between the output shaft of the gearbox and the drive wheels. Power and torque delivered by the propulsion units will be transferred through the gearbox and further to the output shaft of the gearbox. From the output shaft of the gearbox the power and torque will be transferred further through the propeller shaft to the drive wheels. In addition, due to the mass and weight of the vehicle, power and torque from the drive wheels, during driving conditions when the vehicle drives without power generated by the propulsion units, are transferred from the drive wheels through the propeller shaft and the output shaft further to the gearbox.

Controlling the powertrain to gradually transfer propelling torque from the second main shaft to the first main shaft may comprise maintaining the same propelling torque on the output shaft of the gearbox. The propelling torque on the output shaft of the gearbox is the actual torque propelling the vehicle. The propelling torque on the output shaft of the gearbox may be a demanded torque requested from the operator of the vehicle minus the torque extracted by the power consumer. The load of the at least one power consumer may thus cause an offset between the demanded torque and the provided torque on the output shaft of the gearbox. The demanded torque may be determined according to conventional methods, for example based on signals from an accelerator pedal.

The gearbox may comprise any number of gear pairs. Each gear pair may comprise a cogwheel arranged on the lay shaft and a pinion gear arranged on the first main shaft or the second main shaft. The cogwheels may be configured to be mechanically connectable to and disconnectable from the lay shaft. The pinion gears may be fixedly connected to the first main shaft or the second main shaft. When a cogwheel is connected to the lay shaft, the cogwheel rotates together with the lay shaft. When a cogwheel is disconnected from the lay shaft, the cogwheel can rotate in relation to the lay shaft. When the cogwheel of a gear pair is connected to the lay shaft, a corresponding gear is engaged. Thus, a number of fixed gear steps may be obtained by means of the gearbox. A gear pair may thus be disconnected, wherein the corresponding cogwheel is disconnected from the lay shaft, and a gear pair may be connected, wherein the corresponding cogwheel is connected to the lay shaft. Alternatively, the cogwheels may be fixedly connected to the lay shaft and the pinion gears may be mechanically connectable to and disconnectable from the first main shaft or the second main shaft. With a gearbox where propelling torque can be split between a first main shaft and a second main shaft, a gear pair can always be connected to the first main shaft and the lay shaft. Thus, a gear associated with the first main shaft may always be engaged, even when propelling torque is not provided on the first main shaft. Similarly, a gear pair can always be connected to the second main shaft and the lay shaft.

The cogwheels may be configured to be mechanically connected to and disconnected from the lay shaft or the first main shaft or the second main shaft by means of coupling elements. The coupling elements may each comprise an annular sleeve, which is displaced axially between a connected and a disconnected state. The sleeve may be displaced between the connected and disconnected state by means of a power element.

When the first electrical machine and the second electrical machine are propulsion units, the vehicle is propelled by electrical power. The electrical power may be transferred to the electrical machines from energy storage units in the vehicle, such as batteries. The first electrical machine is connected to the first main shaft, and the second electrical machine is connected to the second main shaft.

The first main shaft and the second main shaft are connectable to the first and second electrical machines, so that propelling torque can be provided on the first main shaft and the second main shaft simultaneously. Propelling torque may thus be provided in parallel. Propelling torque is thus provided by means of the first and second electrical machines to propel the vehicle. The first main shaft and the second main shaft may thus be arranged, so that propelling torque provided by means of the first and second electrical machines can be divided/split between the first main shaft and the second main shaft.

The powertrain may be controlled to gradually transfer propelling torque from the second main shaft to the first main shaft by gradually reducing power and torque from the second electrical machine on the second main shaft and so that propelling torque provided by the first electrical machine on the first main shaft is gradually increased by gradually increasing power and torque from the first electrical machine on the first main shaft. In addition, the powertrain may be controlled to gradually transfer propelling torque from the first main shaft to the second main shaft by gradually reducing power and torque from the first electrical machine on the first main shaft and so that propelling torque provided by the second electrical machine on the second main shaft is gradually increased by gradually increasing power and torque from the second electrical machine on the second main shaft.

The connection shaft, which is connected to the first electrical machine, may be connected to a rotor shaft of the first electrical machine. The connection shaft will make it possible to connect equipment to the first electrical machine. The equipment may be driven by the first electrical machine via the connection shaft. The equipment may alternatively or in combination provide power and propeller torque to the gearbox together with the first electrical machine.

Each of the gear pairs of the gearbox has a gear ratio, which is adapted to the vehicle's desired driving characteristics. The gear pair with the highest gear ratio, in relation to the other gear pairs, is suitably connected when the lowest gear is engaged. The gear pair with the highest gear ratio may be referred to as the start gear. The gear pair constituting the start gear may be connected to the second main shaft and the lay shaft. This way, the vehicle can be started to move from standstill without interrupting the power supply and torque to the first power consumer connected to the first main shaft.

The first power consumer may be connected to a first auxiliary shaft, which may be connected to the first main shaft via the first gear pair or any other gear pair/pinion gear connected to the first main shaft. A first auxiliary pinion gear may be fixedly arranged on the first auxiliary shaft. The first auxiliary pinion gear may be arranged in engagement with the first gear pair or any other gear pair connected to the first main shaft. The first auxiliary pinion gear may thus be arranged in engagement with the first pinion gear on the first main shaft. The first auxiliary shaft being connected to the first main shaft means that the power consumer connected to the first auxiliary shaft is not connected to the propulsion of the vehicle.

Alternatively or in combination, the second power consumer is connected to and driven by the connection shaft, which is connected to the first electrical machine. When driven by the connection shaft, the first main shaft transfers torque and rotation motion to the second power consumer. The second power consumer may alternatively to, or in combination with the first power consumer be connected to the powertrain. The second power consumer can be driven during standstill, take off and driving of the vehicle. The second power consumer can also be driven during gear shifting in the gearbox. According to an example, the powertrain comprises also a combustion engine as propulsion unit. However, the second power consumer can also be driven when the combustion engine is switched off.

The powertrain may be controlled to provide uninterrupted propelling torque on the first main shaft during a stand still condition of the output shaft of the gearbox. Since the first power consumer may be connected to the first main shaft, the first power consumer may be driven during a stand still condition of the output shaft of the gearbox and thus a stand still condition of the vehicle.

The powertrain may alternatively be controlled to provide uninterrupted propelling torque on the connection shaft during a stand still condition of the output shaft of the gearbox. Since the second power consumer may be connected to the connection shaft, the second power consumer may be driven during a stand still condition of the output shaft of the gearbox and thus a stand still condition of the vehicle.

The powertrain may alternatively be controlled to provide uninterrupted propelling torque on the first main shaft and on the connection shaft during a stand still condition of the output shaft of the gearbox. Since the first power consumer may be connected to the first main shaft and second power consumer may be connected to the connection shaft, both the first and second power consumers may be driven during a stand still condition of the output shaft of the gearbox and thus a stand still condition of the vehicle.

The powertrain may be controlled to provide uninterrupted propelling torque on the first main shaft during a transition from a stand still condition to a rotational condition of the output shaft of the gearbox. Since the first power consumer may be connected to the first main shaft, the first power consumer may be uninterrupted driven during a transition from a stand still condition to a rotational condition of the output shaft of the gearbox. This means that the first power consumer may be uninterrupted driven during a take-off of the vehicle.

The powertrain may alternatively be controlled to provide uninterrupted propelling torque on the connection shaft during a transition from a stand still condition to a rotational condition of the output shaft of the gearbox. Since the second power consumer may be connected to the connection shaft, the second power consumer may be uninterrupted driven during a transition from a stand still condition to a rotational condition of the output shaft of the gearbox. This means that the second power consumer may be uninterrupted driven during a take-off of the vehicle.

The powertrain may alternatively be controlled to provide uninterrupted propelling torque on the first main shaft and on the connection shaft during a transition from a stand still condition to a rotational condition of the output shaft of the gearbox. Since the first power consumer may be connected to the first main shaft and the second power consumer may be connected to the connection shaft, the first and second power consumers may be driven uninterrupted during a transition from a stand still condition to a rotational condition of the output shaft of the gearbox. This means that both the first and second power consumers may be uninterrupted driven during a take-off of the vehicle.

The powertrain may be controlled to provide uninterrupted propelling torque on the first main shaft during gear shifting from one gear to another gear in the gearbox. Since the first power consumer may be connected to the first main shaft, the first power consumer may be uninterrupted driven during gear shifting from one gear to another gear in the gearbox. This means that the first power consumer may be uninterrupted driven when driving the vehicle.

The powertrain may alternatively be controlled to provide uninterrupted propelling torque on the connection shaft during gear shifting from one gear to another gear in the gearbox. Since the second power consumer may be connected to the connection shaft, the second power consumer may be uninterrupted driven during gear shifting from one gear to another gear in the gearbox. This means that the second power consumer may be uninterrupted driven when driving the vehicle.

The powertrain may alternatively be controlled to provide uninterrupted propelling torque on the first main shaft and on the connection shaft during gear shifting from one gear to another gear in the gearbox. Since the first power consumer may be connected to the first main shaft and the second power consumer may be connected to the connection shaft, the first and second power consumers may be uninterrupted driven during gear shifting from one gear to another gear in the gearbox. This means that both the first and second power consumers may be uninterrupted driven when driving the vehicle and shifting gears in the gearbox. In addition, the first and second power consumers may be uninterrupted driven when driving the vehicle before shifting gears in the gearbox. Further, the first and second power consumers may be uninterrupted driven when driving the vehicle after gears in the gearbox have been shifted.

According to an example, controlling the powertrain to provide uninterrupted propelling torque on the first main shaft and/or on the connection shaft during a stand still condition of the output shaft of the gearbox and/or during a transition from a stand still condition to a rotational condition of the output shaft of the gearbox and/or during gear shifting from one gear to another gear in the gearbox comprises controlling the powertrain to gradually transfer propelling torque from one of the first and second main shaft to the other first or second main shaft.

During a take-off of the vehicle, propelling torque is transmitted only from the second main shaft to the output shaft. Thus, at take-off, essentially no propelling torque to be transmitted to the output shaft is provided on the first main shaft. The torque acting on the first main shaft is intended for the first power consumer. The propelling torque provided on the output shaft of the gearbox is thus transmitted only from the second main shaft and the lay shaft. When the propelling torque is gradually transferred from the second main shaft to the first main shaft, the propelling torque on the output shaft of the gearbox is transmitted from both the first main shaft and the second main shaft.

Shifting gear in a gearbox may require torque balance or synchronized rotational speeds in order to achieve good comfort and reduce wear of gearbox components. With power consumers are connected to the gearbox, it is necessary to know the load applied on the first main shaft and the connection shaft by the power consumers and based on this control the gearbox to achieve torque balance. The load applied by the power consumers may be determined by means of different torque sensors arranged on the connected power consumers.

According to an example, the gearbox further comprises a first planetary gear connected to the first main shaft; a second planetary gear connected to the first planetary gear and the second main shaft, wherein the first electrical machine is connected to the first main shaft via the first planetary gear, and the second electrical machine is connected to the second main shaft via the second planetary gear.

The first planetary gear may comprise a first ring gear connected to the first electrical machine. The first planetary gear may also comprise a first sun wheel and a first planetary wheel carrier. The second planetary gear may comprise a second ring gear connected to the second electrical machine. The second planetary gear may further comprise a second sun wheel and a second planetary wheel carrier. The first planetary wheel carrier may be connected to the combustion engine. The first planetary wheel carrier may further be connected with the second sun wheel of the second planetary gear. The first main shaft may be connected to the first sun wheel of the first planetary gear. The second main shaft may be connected to the second planetary wheel carrier. The second planetary wheel carrier in the second planetary gear may be directly connected with the second main shaft. The first sun wheel in the first planetary gear may be connected with the first main shaft, and the second planetary wheel carrier in the second planetary gear may be connected with the second main shaft. A first set of planetary wheels may be mounted on the first planetary wheel carrier. A second set of planetary wheels may be mounted on the second planetary wheel carrier. The first set of planetary wheels interacts with the first ring gear and the first sun wheel. The second set of planetary wheels interacts with the second ring gear and the second sun wheel.

The electrical machines, which are connected to the planetary gears, may generate power and/or supply torque depending on the desired operating mode. The electrical machines may also, at certain operating times, supply each other with power.

A first and second coupling device may be arranged between the planetary wheel carrier and the sun wheel of the respective planetary gears. The coupling devices may be configured to connect (lock) the respective planetary wheel carriers with the respective sun wheel. When the planetary wheel carrier and the sun wheel are connected with each other, the power from the combustion engine will pass through the planetary wheel carrier, the coupling device, the sun wheel and further along to the first main shaft and/or the second main shaft. This way, the planetary wheels do not absorb any torque. The dimension of the planetary wheels may thereby be adapted to the electrical machine's torque.

According to an example, the at least one propulsion unit further comprises a combustion engine, which is connected to the first planetary gear via the connection shaft.

According to an example, the at least one propulsion unit comprises a combustion engine, a first electrical machine and a second electrical machine. The gearbox may further comprise a first planetary gear connected to the combustion engine and the first main shaft; a second planetary gear connected to the first planetary gear and the second main shaft, wherein the first electrical machine is connected to the first planetary gear and the second electrical machine is connected to the second planetary gear. The step of controlling the powertrain may thereby comprise controlling the combustion engine and/or the first electrical machine and/or the second electrical machine to gradually transfer propelling torque from the second main shaft to the first main shaft. The powertrain is thus a hybrid powertrain in this example. This powertrain enables gear shifting without torque interruption. Also, with the powertrain comprising two planetary gear units, conventional slip clutches between the combustion engine and the gearbox may be avoided.

According to an example, the method comprising the further step: controlling the first and/or the second electrical machine to start the combustion engine.

Start the combustion engine is possible when controlling the first and/or the second electrical machine to transfer torque to the combustion engine. Starting the combustion engine is possible when driving the vehicle. Torque may be transferred to the combustion engine even though torque is transferred to the output shaft and to the power consumers.

According to an example, an output shaft of the combustion engine is connected to the first planetary gear via the connection shaft and wherein the output shaft of the combustion engine is connectable to the connection shaft by a controllable clutch, wherein the method comprising the further steps: controlling a start motor of the combustion engine for starting the combustion engine, controlling the first and/or the second electrical machine for synchronizing the rotational speed of the connection shaft with the rotational speed of an output shaft of the combustion engine, and controlling the clutch for connecting the combustion engine with the connection shaft.

The controllable clutch for connecting and disconnecting the output shaft of the combustion engine with the connection shaft may comprise an annular sleeve, which is displaced axially between a connected and a disconnected state. The sleeve may be displaced between the connected and disconnected state by means of a power element.

By controlling the clutch for disconnecting the combustion engine from the connection shaft, the output shaft of the combustion engine is free to rotate in relation to the connection shaft and thus the gearbox. Thus, the output shaft of the combustion engine may rotate with a different rotational speed in relation to a rotational speed of the connection shaft. In addition, the output shaft of the combustion engine may stand still when the connection shaft rotates.

When the output shaft of the combustion engine is disconnected from the connection shaft, the start motor of the combustion engine is controlled for starting the combustion engine. After the combustion has started, the combustion engine may idle on a low rotational speed on the output shaft of the combustion engine. However, the rotational speed of the output shaft of the combustion engine may have rotational speed which is different from the idle speed after the combustion engine has started.

In order to connect the output shaft of the combustion engine with the connection shaft, the first and/or the second electrical machine are controlled for synchronizing the rotational speed of the connection shaft with the rotational speed of an output shaft of the combustion engine. When the rotational speeds of the output shaft of the combustion engine and the connection shaft are synchronized, the clutch is controlled for connecting the combustion engine with the connection shaft.

According to an example, the gearbox further comprises a planetary gear connected to the second main shaft, wherein the second electrical machine is connected to the second main shaft via the second planetary gear.

The gearbox may be provided with a planetary gear, which is connected to the second main shaft and to the second electrical machine. The planetary gear may transmit torque and rotational speed from the second electrical machine to the second main shaft. In addition the, torque and rotational speed from the second main shaft may be transmitted to the second electrical machine when the second electrical machine works as a generator. The planetary gear may also be connected to the first electrical machine. A sun wheel of the planetary gear may connected to the first electrical machine, a planetary wheel carrier may be connected to the second main shaft and a ring gear may be connected to the second electrical machine.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above.

According to another aspect of the present disclosure, a vehicle comprising a powertrain is provided. The powertrain comprises at least one propulsion unit; a gearbox; and a control device. The gearbox comprising: a first main shaft; a second main shaft; an output shaft of the gearbox connected to drive wheels of the vehicle; a lay shaft connected to the first main shaft, the second main shaft and the output shaft of the gearbox; a first gear pair connected to the first main shaft and the lay shaft; a second gear pair connected to the second main shaft and the lay shaft; and at least one power consumer connected to a powertrain, wherein the at least one propulsion unit comprises a first electrical machine and a second electrical machine, wherein the first electrical machine is connected to the first main shaft and the second electrical machine is connected to the second main shaft; wherein a connection shaft is connected to the first electrical machine; wherein the at least one power consumer comprises a first power consumer connected to the first main shaft and/or a second power consumer connected to the connection shaft; and wherein the control device is configured to control the powertrain to provide uninterrupted propelling torque on the first main shaft and/or on the connection shaft during a stand still condition of the output shaft of the gearbox and/or during a transition from a stand still condition to a rotational condition of the output shaft of the gearbox, and/or during gear shifting from one gear to another gear in the gearbox.

It will be appreciated that all the embodiments described for the method aspect of the disclosure performed by the control device are also applicable to the vehicle and control device aspect of the disclosure. That is, the control device may be configured to perform any one of the steps of the method according to the various examples described above.

The control device may be configured to control the powertrain to provide uninterrupted propelling torque on the first main shaft and/or on the connection shaft during a stand still condition of the output shaft of the gearbox and/or during a transition from a stand still condition to a rotational condition of the output shaft of the gearbox, and/or during gear shifting from one gear to another gear in the gearbox. The control device may be configured to control the powertrain to gradually transfer propelling torque from one of the first and second main shaft to the other first or second main shaft. The control device may be configured to control the first and/or the second electrical machine to start the combustion engine. The control device may be configured to control a start motor of the combustion engine for starting the combustion engine, control the first and/or the second electrical machine for synchronizing the rotational speed of the connection shaft with the rotational speed of an output shaft of the combustion engine, and control the clutch for connecting the combustion engine with the connection shaft.

The power consumers may comprise a power take-off, an air compressor, an air conditioning device or similar. The power consumers may comprise a hot shift connection to the powertrain. By gradually transfer propelling torque between the main shafts it will be possible to connect and disconnect a power consumer by reduce or cease any torque on the main shaft connected to the power consumer, but still deliver torque on the output shaft. When no torque is transmitted to the power consumer, the power consumer may be connected or disconnected.

The present disclosure will now be further illustrated with reference to the appended figures.

FIG. 1 shows a schematic side view of a vehicle 1. The vehicle 1 comprises a gearbox 2 and at least one propulsion unit 4, which are comprised in a powertrain 3 of the vehicle 1. The at least one propulsion unit 4 is connected to the gearbox 2, and the gearbox 2 is further connected to drive wheels 6 of the vehicle 1. The at least one propulsion unit 4 may comprise an internal combustion engine 4 and/or an electrical machine 14, 16. In the event that the vehicle 1 comprises at least two propulsion units 4, 14, 16, comprising one internal combustion engine 4 and at least one electrical machine 14, 16, the powertrain 3 constitutes a hybrid powertrain. The vehicle 1 further comprises at least one power consumer PC1, PC2 connected to the powertrain 3 for power supply.

Figure 2:
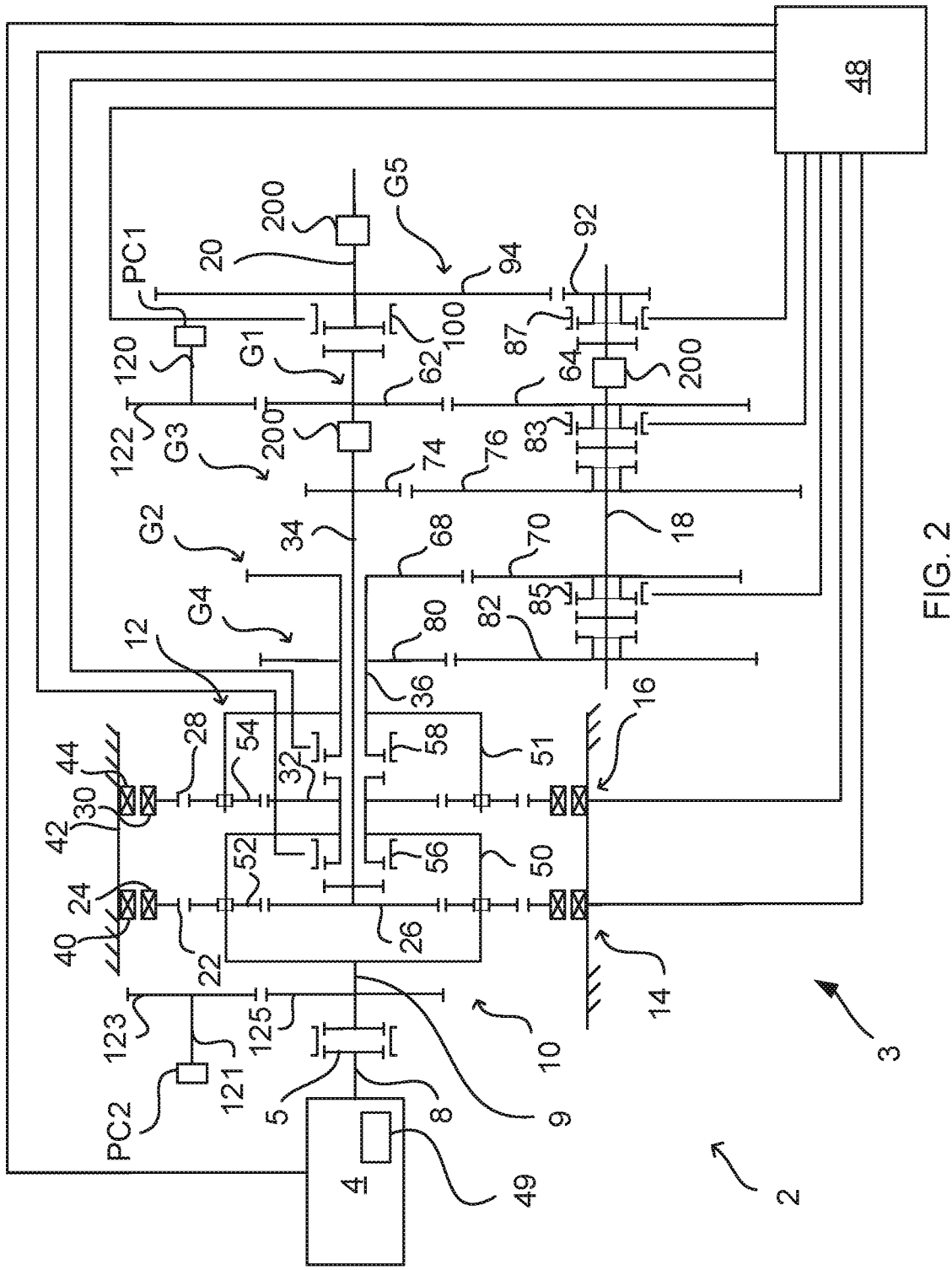
FIG. 2 schematically illustrates a powertrain of a vehicle according to an example.

FIG. 2 schematically illustrates a powertrain 3 according to an example. The powertrain 3 may be comprised in a vehicle 1 as disclosed in FIG. 1. The powertrain 3 comprises a gearbox 2 and at least one propulsion unit 4, 14, 16 connected to the gearbox 2. In this example, the powertrain 3 comprises a combustion engine 4, a first electrical machine 14 and a second electrical machine 16. The combustion engine 4 is connected with the gearbox 2 via connection shaft 9 of the gearbox 2. An output shaft 8 of the combustion engine 4 is connectable to the connection shaft 9 by a controllable clutch 5. The gearbox 2 comprises a first main shaft 34; a second main shaft 36; an output shaft 20 of the gearbox connected to drive wheels 6 of the vehicle 1; a lay shaft 18 connected to the first main shaft 34, the second main shaft 36 and the out-put shaft 20; a first gear pair G1 connected to the first main shaft 34 and the lay shaft 18; and a second gear pair G2 connected to the second main shaft 36 and the lay shaft 18. The first main shaft 34 and the second main shaft 36 are connectable to the at least one propulsion unit 4, 14, 16, such that propelling torque can be provided on the first main shaft 34 and the second main shaft 36 simultaneously.

The powertrain 3 further comprises a first auxiliary shaft 120 connected to a first power consumer PC1 and to the first main shaft 34 of the gearbox 2. The first power consumer PC1 extracts torque from the powertrain 3 via the first auxiliary shaft 120 and thereby applies a load on the powertrain 3. The first auxiliary shaft 120 is connected to the first main shaft via, for example, the first gear pair G1 or any other gear pair connected to the first main shaft 34 and the lay shaft 18. A first auxiliary pinion gear 122 may be fixedly arranged on the first auxiliary shaft 120. The first auxiliary pinion gear 122 may thus be arranged in engagement with the first gear pair G1 or any other gear pair connected to the first main shaft 34.

The powertrain 3 further comprises a second auxiliary shaft 121 connected to a second power consumer PC2 and to the connection shaft 9 of the gearbox 2. The second power consumer PC2 extracts torque from the powertrain 3 via the second auxiliary shaft 121 and thereby applies a load on the powertrain 3. The second auxiliary shaft 121 is connected to the connection shaft 9 via a second auxiliary pinion gear 123 and a drive gear wheel 125 connected to the connection shaft 9. The second auxiliary pinion gear 123 may be fixedly arranged on the second auxiliary shaft 121. The second auxiliary pinion gear 123 may thus be arranged in engagement with the drive gear wheel 125 connected to the connection shaft 9.

The gearbox 2 further comprises a first planetary gear 10 and a second planetary ear 12. The first planetary gear 10 is connected to the connection shaft 9. The second planetary gear 12 is connected to the first planetary gear 10. The first planetary gear 10 comprises a first ring gear 22 connected to a first rotor 24 of the first electrical machine 14. The first planetary gear 10 also comprises a first sun wheel 26 and a first planetary wheel carrier 50. The second planetary gear 12 comprises a second ring gear 28 connected to a second rotor 30 of the second electrical machine 16. The second planetary gear 12 further comprises a second sun wheel 32 and a second planetary wheel carrier 51. The first planetary wheel carrier 50 may be connected to the connection shaft 9. The first planetary wheel carrier 50 may further be connected with the second sun wheel 32 of the second planetary gear 12.

The first main shaft 34 may be connected to the first sun wheel 26 of the first planetary gear 10. The second main shaft 36 may be connected to the second planetary wheel carrier 51. The first and the second sun wheels 26, 32 may be coaxially arranged. The first main shaft 34 may extend coaxially inside the second main shaft 36. It is also possible to arrange the first main shaft 34 in parallel with and next to the second main shaft 36.

The first electrical machine 14 may comprise a first stator 40 connected to a gearbox housing 42 surrounding the gearbox 2. The second electrical machine 16 may comprise a second stator 44 connected to the gear housing 42. The first electrical machine 14 and the second electrical machine 16 are connected to an energy storage device (not shown), such as a battery, which, depending on the vehicle's 1 operating mode, may drive the electrical machines 14, 16. At other operating modes, the electrical machines 14, 16 may operate as generators, wherein power is supplied to the energy storage device. In some operating modes, the electrical machines 14, 16 may drive each other. Electric power is then led from one of the electrical machines 14, 16 to the other electrical machine 14, 16.

A first set of planetary wheels 52 is mounted on the first planetary wheel carrier 50. A second set of planetary wheels 54 is mounted on the second planetary wheel carrier 51. The first set of planetary wheels 52 interacts with the first ring gear 22 and the first sun wheel 26. The second set of planetary wheels 54 interacts with the second ring gear 28 and the second sun wheel 32.

A first coupling device 56 is arranged between the first sun wheel 26 and the first planetary wheel carrier 50. When the first coupling device 56 is arranged, such that the first sun wheel 26 and the first planetary wheel carrier 50 are connected with each other, the first sun wheel 26 and the first planetary wheel carrier 50 cannot rotate in relation to each other. The first planetary wheel carrier 50 and the first sun wheel 26 will thereby rotate with equal rotational speeds.

A second coupling device 58 is arranged between the second sun wheel 32 and the second planetary wheel carrier 51. When the second coupling device 58 is arranged, such that the second sun wheel 32 and the second planetary wheel carrier 51 are connected with each other, the second sun wheel 32 and the second planetary wheel carrier 51 cannot rotate in relation to each other. The second planetary wheel carrier 51 and the second sun wheel 32 will thereby rotate with equal rotational speeds.

The first and second coupling devices 56, 58 may comprise a splines-equipped coupling sleeve, which is axially displaceable on a splines-equipped section on the first and second planetary wheel carrier 50, 51, and on a splines-equipped section on the respective sun wheels 26, 32.

The first and second coupling device 56, 58 according to this example are arranged between the first sun wheel 26 and the first planetary wheel carrier 50, and between the second sun wheel 32 and the second planetary wheel carrier 51, respectively. However, it is possible to arrange an additional or alternative coupling device (not shown) between the first ring gear 22 and the first planetary wheel carrier 50, and also to arrange an additional or alternative coupling device (not shown) between the second ring gear 28 and the second planetary wheel carrier 51.

The first planetary wheel carrier 50 in the first planetary gear 10 is, in this example, fixedly connected with the second sun wheel 32 of the second planetary gear 12.

The first gear pair G1 may comprise a first pinion gear 62 and a first cogwheel 64, which are in engagement with each other. The first pinion gear 62 may be arranged on the first main shaft 34 and the first cogwheel 64 may be arranged on the lay shaft 18. The auxiliary pinion gear 122 on the auxiliary shaft 120 may be arranged in engagement with the first pinion gear 62 on the first main shaft 34. The second gear pair G2 comprises a second pinion gear 68 and a second cogwheel 70, which are in engagement with each other. The second pinion gear 68 may be arranged on the second main shaft 36 and the second cogwheel 70 may be arranged on the lay shaft 18. The gearbox 2 may further comprise a third gear pair G3 connected with the first main shaft 34 and the lay shaft 18. The third gear pair G3 comprises a third pinion gear 74 and a third cogwheel 76, which are in engagement with each other. The third pinion gear 74 may be arranged on the first main shaft 34 and the third cogwheel 76 may be arranged on the lay shaft 18. The auxiliary pinion gear 122 on the auxiliary shaft 120 may be arranged in engagement with the third pinion gear 74 on the first main shaft 34. The gearbox 2 may further comprise a fourth gear pair G4 connected to the second main shaft 36 and the lay shaft 18. The fourth gear pair G4 comprises a fourth pinion gear 80 and a fourth cogwheel 82, which are in engagement with each other. The fourth pinion gear 80 may be arranged on the second main shaft 36 and the fourth cogwheel 82 may be arranged on the lay shaft 18.

The first and the third pinion gears 62, 74 may be fixedly connected to the first main shaft 34, so that they cannot rotate in relation to the first main shaft 34. The second and the fourth pinion gears 68, 80 may be fixedly connected with the second main shaft 36, so that they cannot rotate in relation to the second main shaft 36.

The first, second, third and fourth cogwheels 64, 70, 76, 82 may be individually connected to and disconnected from the lay shaft 18 by means of a third and a fourth coupling element 83, 85. The coupling elements 83, 85 may each comprise coupling sleeves configured to mechanically engage with splines-equipped sections on the cogwheels 64, 70, 76, 82 and on the lay shaft 18. The first and third cogwheels 64, 76 may be connected/disconnected with a common coupling element 83, and the second and fourth cogwheels 70, 82 may be connected/disconnected with a common coupling element 85. In the disconnected state, a relative rotation may occur between the cogwheels 64, 70, 76, 82 and the lay shaft 18. In the connected state, the cogwheel 64, 70, 76, 82 will rotate together with the lay shaft 18.

The gearbox 2 also comprises a fifth gear pair G5. The fifth gear pair G5 comprises a fifth cogwheel 92 arranged on the lay shaft 18 and a fifth pinion gear 94 arranged on the output shaft 20 of the gearbox. The lay shaft 18 is connected to the output shaft 20 of the gearbox via the fifth gear pair G5. The fifth cogwheel 92 is arranged so it may be connected with and disconnected from the lay shaft 18 by means of a fifth coupling element 87. The fifth coupling element 87 may comprise a coupling sleeve configured to interact with splines-equipped sections on the fifth cogwheel 92 and the lay shaft 18. In the disconnected state, a relative rotation may occur between the fifth cogwheel 92 and the lay shaft 18.

Propelling torque may be transferred from the connection shaft 9 of the gearbox 2 to the output shaft 20 of the gearbox 2 via the first or the second planetary gear 10, 12 and the lay shaft 18. The torque transfer may also occur directly via the first planetary gear 10 and the first main shaft 34 to the output shaft 20 of the gearbox via a coupling mechanism 100. The coupling mechanism 100 may comprises a splines-equipped coupling sleeve, which is axially displaceable on the first main shaft 34 and on splines-equipped sections of the output shaft 20 of the gearbox. By displacing the coupling element 100, so that the first main shaft 34 is connected to the output shaft 20 of the gearbox, the first main shaft 34 and the output shaft 20 of the gearbox will have the same rotational speed. By disconnecting the fifth cogwheel 92 from the lay shaft 18, torque from the second planetary gear 12 may be transferred to the lay shaft 18, from the lay shaft 18 to the first main shaft 34, and finally to the output shaft 20 of the gearbox via the coupling mechanism 100.

During operation, the gearbox 2 may in some operating modes operate so that one of the sun wheels 26, 32 are connected to the first and the second planetary wheel carrier 50, 51 by means of the first and the second coupling device 56, 58, respectively. The first and the second main shaft 34, 36 may then obtain the same rotational speed as the connection shaft 9 of the gearbox 2. One or both of the electrical machines 14, 16 may operate as a generator to generate electric power to an energy storage device. Alternatively, the electrical machine 14, 16 may provide additional torque, in order to thus increase the torque on the output shaft 20 of the gearbox.

It is also possible that both the first and the second electrical machine 14, 16 generate power to the energy storage device. At engine braking the driver releases the accelerator pedal (not displayed) of the vehicle 1. The output shaft 20 of the gearbox 2 then operates one or both electrical machines 14, 16 while the combustion engine 4 and the electrical machines 14, 16 engine brake. This operating state is referred to as regenerative braking.

The powertrain 3 further comprises a control device 48. It is to be understood that the control device 48 may be implemented as a separate entity or distributed in two or more physical entities. The control device 48 may comprise one or more control units and/or computers. The control device 48 may thus be implemented or realised by the control device 48 comprising a processor and a memory, the memory comprising instructions, which when executed by the processor causes the control device 48 to perform the herein disclosed method steps. The control device 48 may thus be configured to control the powertrain 3 to gradually transfer propelling torque from the second main shaft 36 to the first main shaft 34. The powertrain 3 may comprise rotational speed sensors 200 arranged, for example, on the first main shaft 34, the lay shaft 18 and/or the output shaft 20 of the gearbox.

The control device 48 is connected to the electrical machines 14, 16 to control the respective electrical machine 14, 16. The control device 48 may be configured to collect information from the components of the powertrain 3 and based on this control the electrical machines 14, 16 to operate as electric motors or generators. The control device 48 may be a computer with software suitable for this purpose. The control device 48 also be connected to the first and second coupling devices 56, 58, the third and fourth coupling elements 83, 85 and the coupling mechanism 100. These components are preferably activated and deactivated by electric signals from the control device 48. (tag in särdrag från kraven och beskriv vad styrenheten kan göa) The control device 48 is configured to control the powertrain 3 to provide uninterrupted propelling torque on the first main shaft 34 and/or on the connection shaft 9 during a stand still condition of the output shaft of the gearbox and/or during a transition from a stand still condition to a rotational condition of the output shaft 20 of the gearbox, and/or during gear shifting from one gear to another gear in the gearbox 2. The control device 48 is further configured to control the powertrain 3 to gradually transfer propelling torque from one of the first and second main shaft 34, 36 to the other first or second main shaft 34, 36. The control device 48 is further configured to control the first and/or the second electrical machine 14, 16 to start the combustion engine 4.

Alternatively, the control device 48 is configured to control the clutch for disconnecting the combustion engine 4 from the connection shaft 9, control a start motor 49 of the combustion engine 4 for starting the combustion engine 4, control the first and/or the second electrical machine 14, 16 for synchronizing the rotational speed of the connection shaft 9 with the rotational speed of an output shaft of the combustion engine 4, and control the clutch for connecting the combustion engine 4 with the connection shaft 9.

The example in FIG. 2 shows four gear pairs G1, G2, G3, G4, and two planetary gears 10, 12 with associated electrical machines 14, 16. However, it is possible to configure the gearbox 2 with more or fewer pinion gears and cogwheels, and with more planetary gears with associated electrical machines.

Figure 3:
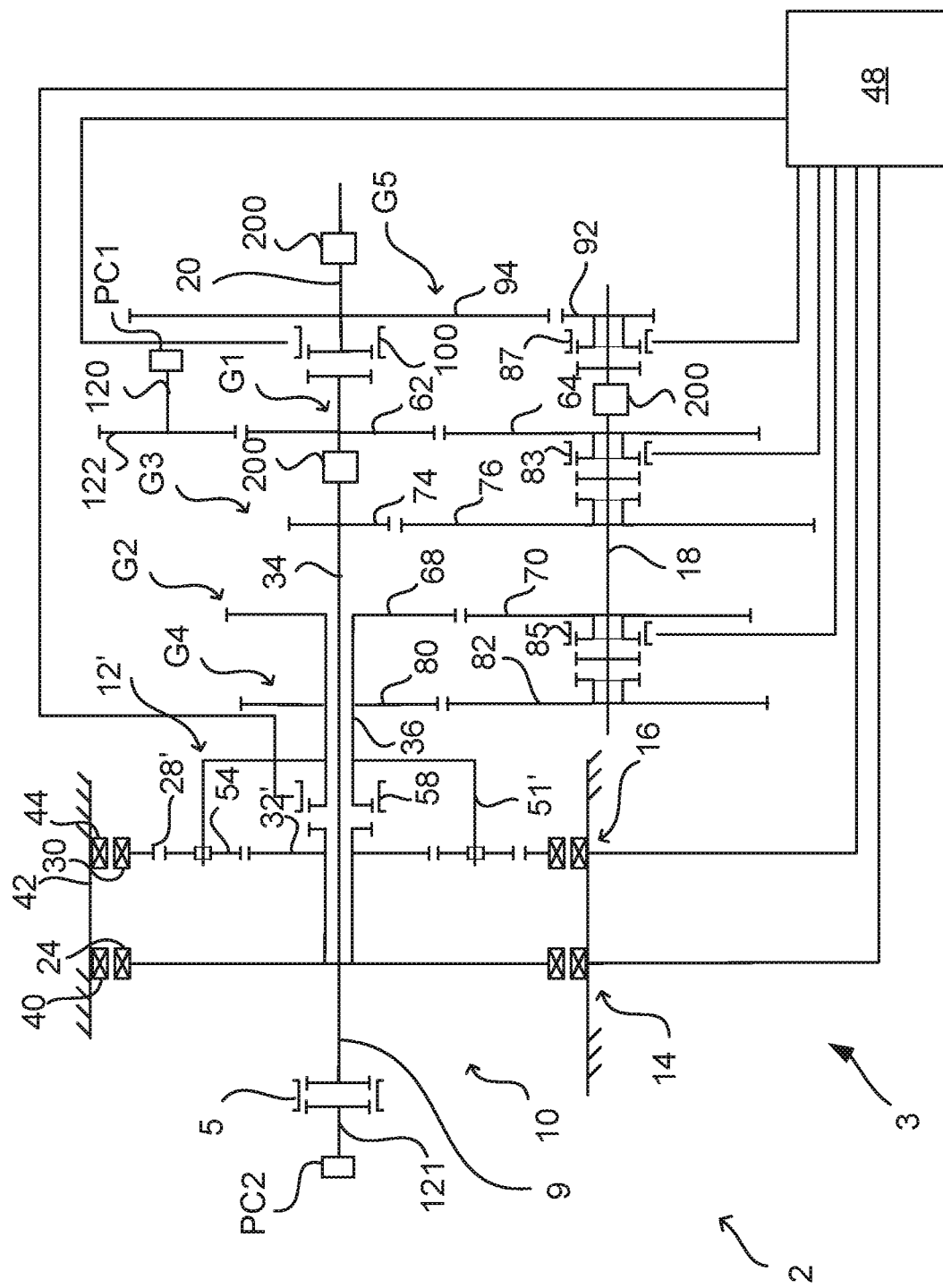
FIG. 3 schematically illustrates a powertrain of a vehicle according to an example.

FIG. 3 schematically illustrates a powertrain 3 according to an example. The powertrain 3 may be comprised in a vehicle 1 as disclosed in FIG. 1. The gearbox 3 comprises a planetary gear 12' connected to the second main shaft 36, wherein the second electrical machine 16 is connected to the second main shaft 36 via the planetary gear 12'.

The planetary gear 12' is configured transmit torque and rotational speed from the second electrical machine 16 to the second main shaft 36. The planetary gear 12' is also connected to the first electrical machine 14. A sun wheel 32' of the planetary gear 12' may connected to the first electrical machine 14, a planetary wheel carrier 51' may be connected to the second main shaft 36 and a ring gear 28' may be connected to the second electrical machine 16.

A first auxiliary shaft 120 is connected to a first power consumer PC1 and to the first main shaft 34 of the gearbox 2 similar to the example in FIG. 2. A second auxiliary shaft 121 is connected to a second power consumer PC2 and to the connection shaft 9 of the gearbox 2 via a controllable clutch 5. However, the second power consumer PC2 may be connected directly to the connection shaft 9 of the gearbox 2, without the controllable clutch 5 and without the second auxiliary shaft 121.

The first electrical machine 14 is connected to the first main shaft 34. Besides what is mentioned above, the powertrain 3 has a similar configuration as the powertrain 3 shown in FIG. 2.

Figure 4A:
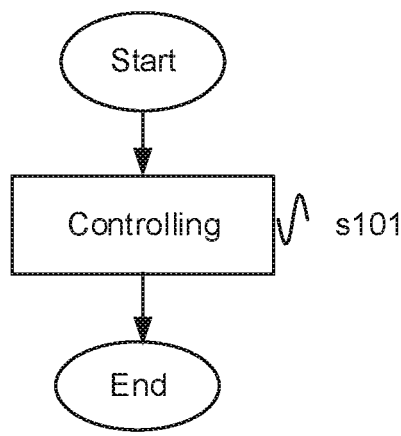
FIG. 4a-4c show flow charts of a method for driving at least one power consumer connected to a powertrain of a vehicle according to examples.
Figure 4B:
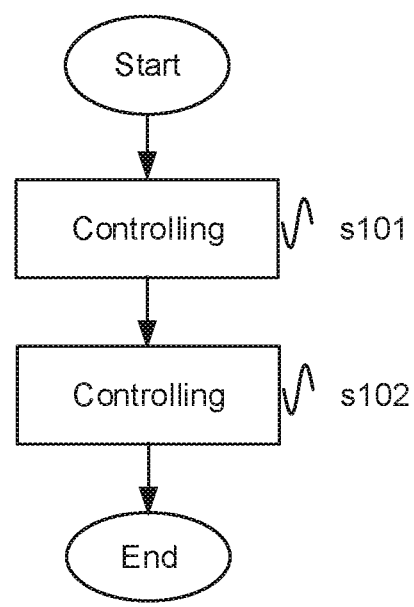
Figure 4C:
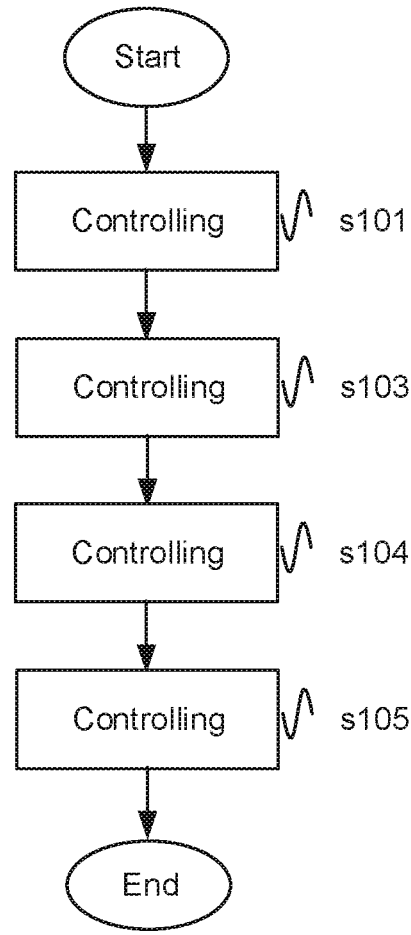

FIGS. 4a-4c show flow charts of a method for driving at least one power consumer connected to a powertrain of a vehicle according to examples. The powertrain 3 may be configured as disclosed in FIG. 2 or FIG. 3. The powertrain 3 may thus relate to a vehicle 1 as disclosed in FIG. 1. The powertrain 3 thus comprising at least one propulsion unit 4, 14, 16 and a gearbox 2. The gearbox 2 comprises: a first main shaft 34; a second main shaft 36; an output shaft 20 of the gearbox connected to drive wheels 6 of the vehicle 1; a lay shaft 18 connected to the first main shaft 34, the second main shaft 36 and the output shaft 20 of the gearbox; a first gear pair G1 connected to the first main shaft 34 and the lay shaft 18; a second gear pair G2 connected to the second main shaft 36 and the lay shaft 18. The at least one propulsion unit comprises a first electrical machine 14 and a second electrical machine 16, wherein the first electrical machine 14 is connected to the first main shaft 34 and the second electrical machine 16 is connected to the second main shaft 36; wherein a connection shaft 9 is connected to the first electrical machine 14; and wherein the at least one power consumer PC1, PC2 comprises a first power consumer PC1 connected to the first main shaft 34 and/or a second power consumer PC2 connected to the connection shaft 9.

According to an example in FIG. 4a, the method comprises: controlling s101 the powertrain 3 to provide uninterrupted propelling torque on the first main shaft 34 and/or on the connection shaft 9 during a stand still condition of the output shaft of the gearbox and/or during a transition from a stand still condition to a rotational condition of the output shaft 20 of the gearbox, and/or during gear shifting from one gear to another gear in the gearbox 2.

According to an example in FIG. 4b, the method comprises: controlling s101 the powertrain 3 to provide uninterrupted propelling torque on the first main shaft 34 and/or on the connection shaft 9 during a stand still condition of the output shaft of the gearbox and/or during a transition from a stand still condition to a rotational condition of the output shaft 20 of the gearbox, and/or during gear shifting from one gear to another gear in the gearbox 2. The method further comprises: controlling s102 the first and/or the second electrical machine 14, 16 to start the combustion engine 4.

According to an example in FIG. 4c, the method comprises: controlling s101 the powertrain 3 to provide uninterrupted propelling torque on the first main shaft 34 and/or on the connection shaft 9 during a stand still condition of the output shaft of the gearbox and/or during a transition from a stand still condition to a rotational condition of the output shaft 20 of the gearbox, and/or during gear shifting from one gear to another gear in the gearbox 2. The method further comprises: controlling s103 a start motor 49 of the combustion engine 4 for starting the combustion engine 4, controlling s104 the first and/or the second electrical machine 14, 16 for synchronizing the rotational speed of the connection shaft 9 with the rotational speed of an output shaft 8 of the combustion engine 4, and controlling s105 the clutch 5 for connecting the combustion engine 4 with the connection shaft 9.

Figure 5:
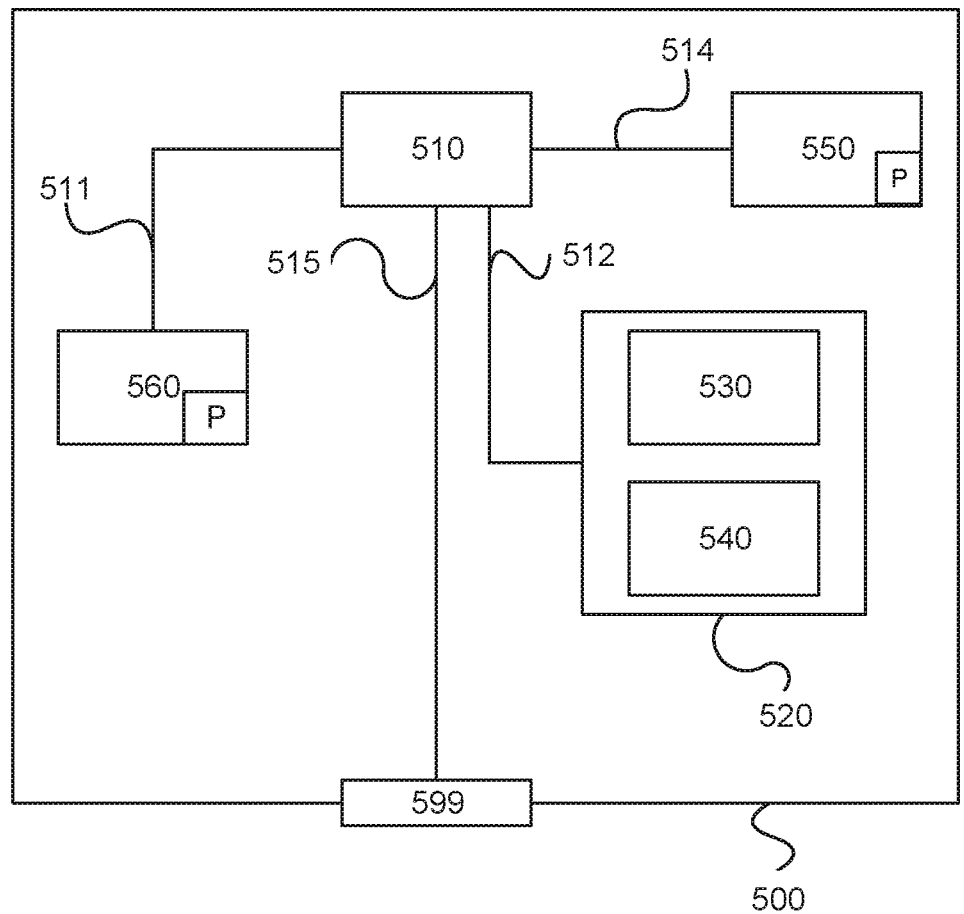
FIG. 5 schematically illustrates a computer according to an example.

FIG. 5 schematically illustrate a version of a device 500. The control device 48 described with reference to FIG. 2-FIG. 3 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 has also a second memory element 540.

There is provided a computer programme P which comprises routines for controlling the powertrain to provide uninterrupted propelling torque on the first main shaft 34 and/or on the connection shaft 9 during a stand still condition of the output shaft of the gearbox and/or during a transition from a stand still condition to a rotational condition of the output shaft 20 of the gearbox, and/or during gear shifting from one gear to another gear in the gearbox 2. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device, for driving at least one power consumer connected to a powertrain of a vehicle, the powertrain comprising at least one propulsion unit and a gearbox, the gearbox comprising:
   a first main shaft;
   a second main shaft;
   an output shaft of the gearbox connected to drive wheels of the vehicle;
   a lay shaft connected to the first main shaft, the second main shaft and the output shaft of the gearbox;
   a first gear pair connected to the first main shaft and the lay shaft;
   a second gear pair connected to the second main shaft and the lay shaft;
   wherein the at least one propulsion unit comprises a first electrical machine and a second electrical machine, wherein the first electrical machine is connected to the first main shaft and the second electrical machine is connected to the second main shaft;
   wherein a connection shaft is connected to the first electrical machine; and
   wherein the at least one power consumer comprises a first power consumer connected to the first main shaft and/or a second power consumer connected to the connection shaft, wherein the gearbox further comprises a first planetary gear connected to the first main shaft; a second planetary gear connected to the first planetary gear and the second main shaft, wherein the first electrical machine is connected to the first main shaft via the first planetary gear, and the second electrical machine is connected to the second main shaft via the second planetary gear;
   the method comprising:
   controlling the powertrain to provide uninterrupted propelling torque on the first main shaft and/or on the connection shaft when the vehicle is in a stand still condition of the output shaft of the gearbox;
   the method further comprising at least one of:
   controlling the powertrain to provide uninterrupted propelling torque on the first main shaft and/or on the connection shaft when the vehicle is in a transition from a stand still condition to a rotational condition of the output shaft of the gearbox; or
   controlling the powertrain to provide uninterrupted propelling torque on the first main shaft and/or on the connection shaft when the vehicle is shifting from one gear to another gear in the gearbox.

2. The method according to claim 1, wherein controlling the powertrain to provide uninterrupted propelling torque on the first main shaft and/or on the connection shaft when the vehicle is in a stand still condition of the output shaft of the gearbox, when the vehicle is in a transition from a stand still condition to a rotational condition of the output shaft of the gearbox, or when the vehicle is shifting from one gear to another gear in the gearbox comprises controlling the powertrain to gradually transfer propelling torque from one of the first main shaft and the second main shaft to the other of the first main shaft or the second main shaft.

3. The method according to claim 1, wherein the at least one propulsion unit further comprises a combustion engine, which is connected to the first planetary gear via the connection shaft.

4. The method according to claim 3, wherein the method comprising the further step:
   controlling the first and/or the second electrical machine to start the combustion engine.

5. The method according to claim 3, wherein an output shaft of the combustion engine is connected to the first planetary gear via the connection shaft and wherein the output shaft of the combustion engine is connectable to the connection shaft by a controllable clutch, wherein the method comprising the further steps:
   controlling a start motor of the combustion engine for starting the combustion engine,
   controlling the first and/or the second electrical machine for synchronizing the rotational speed of the connection shaft with the rotational speed of the output shaft of the combustion engine, and
   controlling the clutch for connecting the combustion engine with the connection shaft.

6. The method according to claim 1, wherein the gearbox further comprises a planetary gear connected to the second main shaft, wherein the second electrical machine is connected to the second main shaft via the planetary gear.

7. A non-transitory computer-readable medium comprising instructions, which when executed by a processor of the control device causes the processor to carry out the method according to claim 1.

8. A vehicle comprising a powertrain, the powertrain comprising:
   at least one propulsion unit;
   a gearbox; and
   a control device,
   the gearbox comprising:
   a first main shaft;
   a second main shaft;
   an output shaft of the gearbox connected to drive wheels of the vehicle;
   a lay shaft connected to the first main shaft, the second main shaft and the output shaft of the gearbox;
   a first gear pair connected to the first main shaft and the lay shaft;
   a second gear pair connected to the second main shaft and the lay shaft; and
   at least one power consumer connected to the powertrain,
   wherein the at least one propulsion unit comprises a first electrical machine and a second electrical machine, wherein the first electrical machine is connected to the first main shaft and the second electrical machine is connected to the second main shaft;

wherein a connection shaft is connected to the first electrical machine; wherein the at least one power consumer comprises a first power consumer connected to the first main shaft and/or a second power consumer connected to the connection shaft, wherein the gearbox further comprises a first planetary gear connected to the first main shaft; a second planetary gear connected to the first planetary gear and the second main shaft, wherein the first electrical machine is connected to the first main shaft via the first planetary gear, and the second electrical machine is connected to the second main shaft via the second planetary gear; and wherein the control device is configured to control the powertrain to provide uninterrupted propelling torque on the first main shaft and/or on the connection shaft when the vehicle is in a stand still condition of the output shaft of the gearbox; and wherein the control device is configured to control the powertrain to provide uninterrupted propelling torque on the first main shaft and/or on the connection shaft when the vehicle is in a transition from a stand still condition to a rotational condition of the output shaft of the gearbox, or when the vehicle is shifting from one gear to another gear in the gearbox.

9. The vehicle according to claim 8, wherein the control device is configured to control the powertrain to gradually transfer propelling torque from one of the first main shaft and the second main shaft to the first main shaft or the second main shaft.

10. The vehicle according to claim 8, wherein the at least one propulsion unit further comprises a combustion engine, which is connected to the first planetary gear via the connection shaft.

11. The vehicle according to claim 10, wherein the control device is configured to control the first and/or the second electrical machine to start the combustion engine.

12. The vehicle according to claim 10, wherein an output shaft of the combustion engine is connected to the first planetary gear via the connection shaft and wherein the output shaft of the combustion engine is connectable to the connection shaft by a controllable clutch, and wherein the control device is configured to control a start motor of the combustion engine for starting the combustion engine, control the first and/or the second electrical machine for synchronizing the rotational speed of the connection shaft with the rotational speed of the output shaft of the combustion engine, and control the clutch for connecting the combustion engine with the connection shaft.

13. The vehicle according to claim 8, wherein the gearbox further comprises a planetary gear connected to the second main shaft, wherein the second electrical machine is connected to the second main shaft via the planetary gear.

14. The method of claim 1, wherein the method comprises:
controlling the powertrain to provide uninterrupted propelling torque on the first main shaft and/or on the connection shaft when the vehicle is in a transition from a stand still condition to a rotational condition of the output shaft of the gearbox; and
controlling the powertrain to provide uninterrupted propelling torque on the first main shaft and/or on the connection shaft when the vehicle is shifting from one gear to another gear in the gearbox.

15. The vehicle according to claim 8, wherein the control device is configured to control the powertrain to provide uninterrupted propelling torque on the first main shaft and/or on the connection shaft when the vehicle is in a transition from a stand still condition to a rotational condition of the output shaft of the gearbox and when the vehicle is shifting from one gear to another gear in the gearbox.

* * * * *